Patented Dec. 29, 1936

2,065,520

UNITED STATES PATENT OFFICE 2,065,520

PROCESS OF LIBERATING FATTY ACIDS IN FATTY MATERIAL

Eddy W. Eckey, Wyoming, and Charles C. Clark, St. Bernard, Ohio, assignors to The Procter & Gamble Company, Cincinnati, Ohio, a corporation of Ohio No Drawing. Application October 26 1933, Serial No. 695,374

16 Claims. (Cl. 87—12)

This invention relates to an improved process for forming free fatty acids in a fatty material and, more particularly, in edible fats. It is a feature of the invention that the formation of the fatty acids is effected without injury to the color, flavor, or keeping quality of the fat.

More specifically, the invention relates to an improved process for converting soap which is mixed with fat to the corresponding free fatty acid.

The method commonly used heretofore of liberating the fatty acids from soap in fatty mixtures has comprised the incorporation in the mixture of an aqueous solution of a mineral acid, usually at the boiling point of the solution, and thereafter to allow the mixture to settle until it separates into an oily layer floating on an aqueous layer. This method is detrimental to the quality of the fat; troublesome emulsions form, especially in the case of superglycerinated fat, i. e. a fatty glyceride mixture containing mono- and/or diglycerides; the color of the fat usually darkens, and the flavor, if the fat is of an edible grade, is injured so that in many cases the product is rendered totally unsuitable for edible purposes. Furthermore, oxidation commonly occurs due to the unavoidable exposure of the fat to air for a considerable period at the high temperature used in the process. These difficulties are overcome by our improved procedure.

It has been recently recognized that the addition of free fatty acid to shortening fats is highly advantageous and thus a need has developed for a method by which free fatty acid may be conveniently and economically formed in such fats without injuring the color, flavor, or keeping quality of the fat. It has also been found that the incorporation of certain amounts of superglycerinated fat in shortening is highly advantageous and in the process of producing mono- and diglycerides by treatment of a triglyceride with additional glycerin in the presence of a soap catalyst, it becomes desirable to decompose this soap catalyst to liberate the fatty acids contained therein. Our invention may be readily employed for this purpose, and the formation of emulsions in mixtures which ordinarily would form relatively stable emulsions is avoided.

It is a further feature of the invention that the salts formed as by-products of the reaction of the soap and acid can be separated readily and completely from the fatty material.

Any desired amount of free fatty acid can be formed in a shortening fat by first treating the fat with a sufficient quantity of caustic soda or other alkali to saponify a portion thereof, and by subsequently decomposing the soap thus formed with a suitable acid. It is an important feature of the present invention that the mixture of fat and soap is treated at a temperature well above the melting point of the fat with an acid strong enough to decompose the soap, the acid being used in rather concentrated form and the conditions of temperature and moisture content being so controlled as to convert the salts formed into a substantially dry precipitate which can be readily separated by filtration or otherwise from the resulting fatty mixture containing free fatty acids.

A suitable filter-aid greatly assists in filtration. We usually practice our process under a vacuum as explained later. The mixture is cooled, but not too near the graining point, before removing from the vacuum vessel, to minimize oxidation when subsequently exposed to the atmosphere.

The acid used for decomposing the soap may, if the product is not required for edible purposes, be any acid which is harmless to the fat and strong enough to decompose the soap and form a salt insoluble in the fat such, for example, as sulphuric, phosphoric, hydrochloric, tartaric, lactic acid, sulphur dioxide, and many others. If, however, the product is intended for edible purposes we prefer to select such an acid as is known to have a favorable retarding effect on the rancidification of the fat. Various acids having antioxidant action on fats may be employed, particularly phosphoric acid and sulphuric acid.

The minimum quantity of added acid is not less than the calculated chemical equivalent of the soap to be decomposed. Thus to decompose one mol. of sodium soap in our process requires one mol. of a monobasic acid such as hydrochloric acid, and preferably no substantial excess of such an acid is used. In the case of polybasic acids, we have found that the optimum quantity, from the standpoint of the quality of the fat mixture obtained in our process, lies between ½ and 1 mol. of added acid to each mol. of fatty acid to be liberated. Aside from the possibility of retarding rancidity of the fat, polybasic acids such as sulphuric and phosphoric acid are preferred over monobasic acids because the buffer action of their acid salts insures a wide range in the quantity of acid which may be added without danger of leaving in the finished product either undecomposed soap or an excess of the free mineral acid.

The concentration of the added acid is preferably between 50 per cent and 85 per cent in aqueous solution. Other concentrations may be used, but when stronger, the reaction is apt not to proceed smoothly or completely, and, if weaker, an undesired amount of water is thereby introduced which may give difficulty in the subsequent filtration unless removed by longer heating than would otherwise be required.

The object of the filter-aid is to assist in filtering the salts formed and any other material such as glycerin, although in many cases the product can be filtered without any added filter-aid. Various filter-aid materials may be used, such as carbon, paper pulp, fuller's earth, kieselguhr, and other materials having good filtering and absorbent properties, but kieselguhr, preferably untreated except for drying and pulverizing, has been found to be especially satisfactory. The quantity required will vary but should be sufficient to form with the precipitated salts etc. a mass that can be readily filtered. In using kieselguhr a weight varying from one half up to twice the weight of the salt to be removed gives satisfactory results. When considerable free glycerin is present, as in the reaction mixture obtained when making superglycerinated fats, more filter-aid is necessary than in the substantial absence of glycerin.

The mixture is agitated during the reaction period by any suitable means, such as a mechanical agitator or a stream of dry steam or other inert gas.

We prefer to operate under reduced pressure although in some cases it is feasible to operate without this condition; for example, if the moisture in the fatty soap mixture and in the added acid is suitably adjusted to yield a precipitated salt dry enough to filter readily with the filter-aid used, or if the mixture can be heated in an open vessel long enough to dry out any excess moisture present, and if exposure to air during the reaction is not objectionable, the vacuum may be dispensed with. On the other hand, if an edible product of high grade and good keeping quality is required, a vacuum is advantageous by preventing exposure to the atmosphere. Furthermore, if, as commonly occurs, enough moisture is present to interfere with the subsequent filtering of the precipitated salts, the vacuum permits the excess moisture to evaporate rapidly even at relatively low temperatures. The degree of vacuum required is not critical, but should be high enough to accomplish the objects stated. We prefer to use a vacuum of at least 25 inches of mercury. It is necessary to have the salts and filter-aid substantially dry when filtered, or otherwise separated in order to obtain a rapid and satisfactory separation.

The best temperature for treatment will vary according to the nature of the fatty mixture, the acid used, and other conditions, but during the addition of the acid it should usually lie between 80° C. and 110° C. It should be well above the melting point of the fat to ensure a rapid and complete reaction, and also to evaporate any excess moisture and coagulate the precipitated salts so that they can be readily filtered.

Precipitated salts and filter-aid are easily separated from the fat by pumping the mixture through an ordinary filter-press. Other methods, such as settling, centrifuging, or combinations of these methods may be used.

The filter cake, or the mass separated from the fat by centrifuging or other means, will unavoidably retain a certain amount of the fatty mixture which, however, can be recovered by various well known means, such as extraction with a volatile solvent or by mixture with water or dilute acids in which case the fatty matter will separate and float on top.

The following examples will show clearly how the invention may be put into practice.

Example 1

A superglycerinated fat mixture consisting of the product obtained by reaction of partially hydrogenated cottonseed oil with glycerol in vacuum at 170° C. with soap as catalyst, in the proportions of hydrogenated cottonseed oil, 100 parts, glycerol, 18.5 parts, sodium soap, 3.3 parts, is treated as follows.

Into a closed tank of 10,000 lbs. capacity, equipped with a mechanical agitator and cooling coils, is put 100 lbs. of kieselguhr (celite F. C.). The opening is closed and a vacuum, preferably of at least 25 inches, is drawn on the tank. Five thousand pounds of the hot reaction product described above (consisting of mono-, di, and triglycerides, together with soap and some free glycerol), is introduced. The agitator is started and water turned into the cooling coils if necessary to cool the mixture. When the temperature has dropped to 105° C., 43 lbs. of ortho-phosphoric acid, 85% strength, is added. The agitation and cooling are continued for about 30 minutes or more when the temperature of the stock is reduced to 65° C., and the reaction is completed. The cooling water is shut off, and the charge is pumped from the acidulating vessel through a filter-press. Filtration is rapid, and a clear oil of good quality containing free fatty acids but no soap is obtained. The cake left in the press consists of kieselguhr mixed with sodium acid phosphates, glycerol, and some fatty matter.

Example 2

Into a round bottom 1 liter flask, fitted with an outlet for drawing a vacuum, and with two inlet tubes, one leading to the bottom of the flask for providing steam agitation, and the other leading into the flask for addition of liquids, is placed 350 grams of the reaction product described in Example 1, together with 7 grams of kieselguhr. A vacuum of 25 inches is applied to the flask, and dry steam is introduced for agitation. The charge is brought to a temperature of 100° C. and then 5 grams of a 50 per cent solution of sulphuric acid is added. Agitation with dry steam is continued for 5 minutes, after which the reaction is complete, and the flask is then cooled rapidly to 65° C. The vacuum is then broken, and the mixture filtered through paper on a suction filter. Filtration is rapid and a soap-free product is obtained, consisting of glycerides and free fatty acids.

Example 3

Ninety-eight pounds of hydrogenated cottonseed oil of lard-like consistency and two lbs. (dry basis) of soda soap made either from the same or from any other fat or oil (or 100 lbs. of hydrogenated cottonseed oil treated with 0.27 pound of caustic soda in such a way as to produce essentially the above mixture) are agitated at 100° C. under reduced pressure with 0.58 lb. of 85 per cent phosphoric acid. One to two pounds of celite filter-aid may also be added, if desired, to facilitate subsequent filtration, although not essential. Agitation under reduced pressure is continued at 100° C. until the salts formed are suitably coagulated and substantially dry. The mixture is then filtered, yielding a clear, fatty mixture containing glycerides and free fatty acids. Filtration, while possible without the filter-aid, is greatly facilitated by its use.

Example 4

Into a round bottom 1 liter flask fitted with an outlet for vacuum and with two inlet tubes, one leading to the bottom of the flask for providing steam agitation and the other leading into the flask for addition of liquids, is placed 350 grams of the reaction product described in Example 1. A vacuum of 25 inches is applied to the flask and dry steam is introduced for agitation. The charge is brought to a temperature of 100° C. and 3 grams of 85 per cent phosphoric acid is added. Agitation with dry steam is continued for 5 minutes, after which the reaction is complete, and the flask is then cooled rapidly and the mixture filtered through paper with suction. Filtration proceeds more slowly than when using a filter-aid, but the precipitated sodium phosphates including the small amount of glycerin ordinarily present in such mixtures as this can be removed by filtering through ordinary filter paper without filter-aid, if desired.

Example 5

One hundred parts of the reaction mixture described in Example 1 are mixed with 4 parts of an acid-activated bleaching earth by means of a motor-driven agitator under a pressure of approximately 1 inch of mercury. With the mixture at 100° C., 1 part of ortho-phosphoric acid, 85% strength, is added and the agitation is continued for 10 minutes. The mixture is cooled rapidly to 65° C. and filtered.

Example 6

A mixture of superglycerinated coconut oil with soap, made by reaction of 100 parts coconut oil with 25 parts glycerol in presence of soap equivalent to 0.45 part caustic soda is mixed with 2 parts of diatomaceous earth, and treated with phosphoric acid as in Example 5.

Certain variations from the conditions specified in the illustrative examples are possible depending on the characteristics of the mixture from which the soap is to be removed and the use to which the product is to be put. By treating a few samples by the procedure described, it is possible to determine in the case of any particular mixture the conditions of temperature and agitation required to obtain the precipitated salt in a form which can readily be separated by filtration or otherwise. We have found that, in general, higher temperatures and longer times of agitation give the best coagulation, although, if the temperature at which the acid is added is too high, or if the agitation is continued too long, the coagulated materials tend to settle out as a heavy mud in the acidulation vessel. On the other hand, if the mixture is agitated for too short a time or at too low a temperature, the coagulation is insufficient and slow filtration results. Between these limits is a range of satisfactory operating conditions, as we have described. The ranges of preferred conditions indicated should not, therefore, be construed to be the limits of the invention.

Having thus described the invention, what is claimed as new and desired to be secured by Letters Patent is:

1. A process for liberating fatty acid by reaction of strong acid with soap in mixture with fat, which comprises adding the strong acid and an inert filter-aid to said mixture, agitating at a temperature at which the fat is fluid and sufficiently high to evaporate excess moisture, until the soap is decomposed and the precipitated salts and filter-aid are coagulated and dried enough to filter, and separating the resulting coagulated salts and filter-aid from the fatty matter.

2. The process described in claim 1, in which the added acid is a polybasic acid having anti-oxidant action on fats, the amount of same being not less than one half of one mol. and not substantially more than one mol. per mol. of fatty acid liberated.

3. A process for increasing the free fatty acid content of fats which comprises mixing together at a temperature between 80° C. and 110° C. molten edible fat, soap, a filter-aid, and a concentrated aqueous solution of an acid having anti-oxidant properties toward fats and selected from the group consisting of sulphuric and phosphoric acids, thereby liberating fatty acid dissolved in the fat and evaporating water from the mixture so as to produce a substantially dry salt of the added acid, and separating the resulting solid mass from the fatty matter.

4. The process described in claim 3, in which the concentration of added acid lies between 50 per cent and 85 per cent anhydrous acid.

5. A process for liberating fatty acid by reaction of strong acid with soap in mixture with fat containing monoglycerides and diglycerides of fatty acids, which comprises adding the strong acid and an inert filter-aid to said mixture, agitating the mixture at a temperature at which the fat is fluid until the soap is decomposed and the precipitated salts and filter-aid are coagulated and dried enough to filter, and separting the resulting coagulated salts and filter-aid from the fatty matter.

6. The process described in claim 5, in which the acid used is phosphoric acid.

7. The process described in claim 1, in which the precipitated salts and filter-aid are dried to a filterable form by maintaining a pressure less than atmospheric and a temperature high enough to evaporate moisture under said reduced pressure during a substantial part of the mixing period.

8. The process described in claim 5, in which the precipitated salts are dried to a filterable form by maintaining a pressure less than atmospheric and a temperature high enough to evaporate moisture under said reduced pressure during a substantial part of the mixing period.

9. A process for liberating fatty acid by reaction of strong acid with soap in mixture with fat, which comprises adding the strong acid to said mixture, agitating at a temperature at which the fat is fluid until the soap is decomposed and the precipitated salts are coagulated and dried enough to filter, and separating the resulting coagulated salts from the fatty matter.

10. The process described in claim 9, in which the added acid is a polybasic acid having anti-oxidant action on fats, the amount of same being not less than one half of one mol. and not substantially more than one mol. per mol. of fatty acid liberated.

11. A process for increasing the free fatty acid content of fats which comprises mixing together at a temperature between 80° C. and 110° C. molten edible fat, soap, and a concentrated aqueous solution of an acid having antioxidant properties toward fats and selected from the group consisting of sulphuric and phosphoric acids, thereby liberating fatty acid dissolved in the fat and evaporating water from the mixture so as to produce a substantially dry salt of the added acid, and separating the resulting solid mass from the fatty matter.

12. The process described in claim 11, in which the concentration of added acid lies between 50 per cent and 85 per cent anhydrous acid.

13. A process for liberating fatty acid by reaction of strong acid with soap in mixture with fat containing monoglycerides and diglycerides of fatty acids, which comprises adding the strong acid, agitating the mixture at a temperature at which the fat is fluid until the soap is decomposed and the precipitated salts are coagulated and dried enough to filter, and separating the resulting coagulated salts from the fatty matter.

14. The process described in claim 13, in which the acid used is phosphoric acid.

15. The process described in claim 9, in which the precipitated salts are dried to a filterable form by maintaining a pressure less than atmospheric and a temperature high enough to evaporate moisture under said reduced pressure during a substantial part of the mixing period.

16. The process described in claim 13, in which the precipitated salts are dried to a filterable form by maintaining a pressure less than atmospheric and a temperature high enough to evaporate moisture under said reduced pressure during a substantial part of the mixing period.

EDDY W. ECKEY.
CHARLES C. CLARK.